July 13, 1948.   G. ORLOB   2,445,183
CAM-CONTROLLED PRESSURE REGULATOR
Filed Aug. 17, 1945

INVENTOR.
GLENN ORLOB
BY
Reynolds + Beach
ATTORNEYS

Patented July 13, 1948

2,445,183

UNITED STATES PATENT OFFICE 2,445,183

CAM-CONTROLLED PRESSURE REGULATOR

Glenn Orlob, Seattle, Wash., assignor to Boeing Airplane Company, a corporation of Delaware Application August 17, 1945, Serial No. 610,950

11 Claims. (Cl. 98—1.5)

To control the pressurization of aircraft cabins for flying at high altitudes various types of control devices have been proposed. Many of such devices, however, have been quite complicated and heavy, or as the altitude varied required frequent attention on the part of the pilot to maintain the desired regulation, or have been capable of effecting only a limited type of regulation.

Frequently it is most convenient to regulate the pressure in an aircraft cabin by controlling the outflow of air from it. Devices capable of accomplishing such regulation are disclosed in the Price Reissue Patent No. 22,272 and in the Cooper Patent No. 2,307,199, for example.

The principal object of my invention is to control the flow of air through an aircraft cabin, and more especially, the setting of a valve regulating the outflow of air from the cabin, by a control unit which is simple in construction, yet which can be designed to regulate the cabin pressure according to any selected plan for different altitudes. In accomplishing such object the operation of the control unit is fully automatic, and requires no attention by the pilot at any altitude.

An additional advantage is that my control unit may be modified readily to regulate the air pressure within the aircraft cabin according to different plans. Moreover it is very compact and light in weight, as well as being economical to manufacture.

Specifically it is an object to provide an improved control unit which is adapted to control a pneumatic valve actuator operatively connected to move a flow control valve, such as one controlling the outflow of air from an aircraft cabin. Such valve actuator and outflow valve may be generally similar to those shown in Patents Re. 22,272 and 2,307,199, mentioned above.

Control mechanism having elements constructed considerably differently from those particularly shown and described herein may operate in accordance with the principles of my invention, and the control device illustrated in the drawings is to be understood as merely one representative type of unit.

In order to provide sufficient flow of replacement air through an aircraft cabin while maintaining the air within it at pressures higher than atmospheric pressure during high altitude flight, it is necessary that air under pressure be supplied to the cabin. In regulating the pressure of the air within the cabin at the desired value, therefore, either the quantity of air supplied to the cabin may be maintained constant and the outflow of air from it regulated as necessary, or the outflow of air from the cabin may be held constant and the quantity of inflowing air may be regulated in the desired manner. In either case cabin air pressure regulating means, including a valve, is employed for the purpose of regulating the flow of air through the cabin, thus to control the pressure within it, and my control unit is capable of controlling either an inflow valve or an outflow valve.

Figure 1:
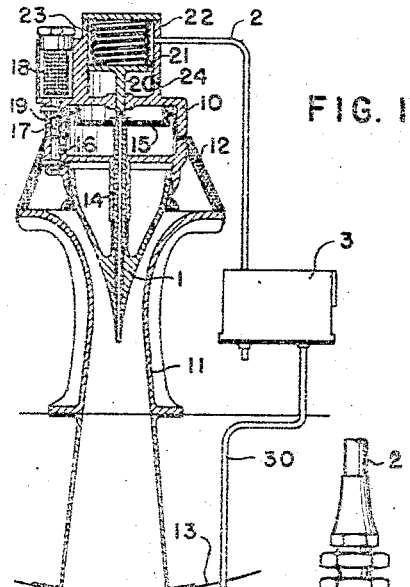
Figure 1 is a side elevational view of my control unit associated with a valve and valve actuator shown in longitudinal section, which is capable of regulating the outflow of air from an aircraft cabin.

In the illustration of Figure 1 an outflow valve 1, actuated by a pneumatic valve actuator 10, is shown. The outlet duct 11 controlled by such valve may be of Venturi shape. Its inlet end covered by a screen 12 communicates directly with the cabin, and its outlet end registers with an aperture in the aircraft skin 13 to discharge air from the cabin to the atmosphere. The valve 1, controlling passage of air through the outlet duct, is tapered generally complementally to the throat of such Venturi duct and is raised or lowered by the valve actuator. The valve is guided for such movement by sliding of its stem 14 in a suitable guide sleeve.

The active element of the pneumatic valve actuator 10 is the diaphragm 15, carried by the upper end of the valve stem 14, which is subjected to differential air pressure. The chamber of the valve actuator below this diaphragm is exposed to cabin air pressure through an aperture 16 and a passage 17. Such passage contains a screen 18 for removing impurities from air entering it from the cabin. The chamber to which the upper side of diaphragm 15 is exposed communicates with a relatively low pressure region, which may be atmosphere.

The degree of opening of valve 1 depends on the air pressure differential on opposite sides of diaphragm 15 of the pneumatic valve actuator 10. While the chamber below this diaphragm is in unrestricted communication with a region of relatively high pressure the chamber above the diaphragm is in restricted communication with such region, for example by the metered port 19 between such chamber and passage 17. Since air may be continually supplied to the upper valve actuator chamber through such port and withdrawn continually from such chamber through a passage communicating with a relatively low pressure region, such as the atmosphere, the air pressure within this chamber may be regulated by varying one or the other of the passages communicating with it. Such regulation will, of course, alter the air pressure differential on the diaphragm.

For purposes of illustration I have shown the outlet from the upper chamber of the valve actuator 10 to the low pressure region to be through a bore in stem 14 of the valve 1, the lower end of which leads to atmosphere through outlet duct 11. Communication between such chamber and the valve stem bore is controlled by the proximity of the lower end of a rod 20 to the upper end of the valve stem. Such rod is guided for movement by a piston 21, slidable in a cylinder 22, with which piston the rod is integral. This piston is normally pressed downward by a spring 23 received in the upper end of the cylinder to close the outlet from the upper chamber of the valve actuator. The action of the spring is opposed by the differential air pressure on the piston. The lower side of this piston is exposed to cabin air pressure in the bottom of its cylinder, which communicates with the cabin through port 24. The upper end of the cylinder is at a lower pressure, being connected by conduit 2 to a region of low air pressure. Air leaks gradually from the high pressure side of the piston 21 to its low pressure side at a predetermined rate, either through a metered bypass or around the piston fitting somewhat loosely in the cylinder.

When the lower end of rod 20 is spaced slightly from the stem 14 of valve 1, therefore, air under pressure continuously flowing into the upper chamber of valve actuator 10 above diaphragm 15 through the restricted orifice 19 may pass out of such chamber by way of the bore through the valve stem to the atmosphere or other low pressure region, thus creating a reduced pressure above such diaphragm. When the air pressure differential on piston 21 is insufficient to raise the lower end of rod 20 above the upper end of the outflow valve stem against the action of spring 23, flow through such stem will be interrupted and the pressure above diaphragm 15 will increase because of the flow of air from the cabin through port 19 into the upper chamber of the valve actuator.

Thus it will be seen that the differential air pressure on piston 21 controls the degree of opening of valve 1. In order to regulate the position of such valve, therefore, it is merely necessary to control the flow of air through conduit 2, and this is accomplished by my control unit. Such outflow valve 1 and the pneumatic servo mechanism for it including diaphragm 15 and the mechanism 20, 21, 23 for regulating the air pressure on it constitutes representative cabin air pressure regulating means operable to control the pressure of the air within the cabin, and are not novel elements of my invention.

Since my control unit operates to control the flow of air through conduit 2, and the disposition of rod 20 relative to the stem 14 of valve 1 performs the same function, the question may arise as to why conduit 2 could not be connected directly to the valve actuator 10, and the rod 20, piston 21, and cylinder 22, with their related parts, be eliminated. While such a construction would be operable theoretically, hunting of the outflow valve is reduced considerably by the follow-up action between the rod 20 and the valve stem. If the valve 1 should tend to open too rapidly, its stem moving upwardly would promptly reduce the opening between such stem and the lower end of rod 20 as it approaches such rod, so that the pressure would build up quickly above diaphragm 15, tending to cause valve 1 to close slightly. This action would occur for any position of rod 20 regardless of the degree of opening of the outflow valve. Conversely the valve stem aperture would be opened to reduce the pressure above the diaphragm if for any reason the outflow valve should drop abruptly. It is preferred, therefore, that the auxiliary piston 21 and cylinder 22 be incorporated in the valve actuator mechanism.

Figure 2:
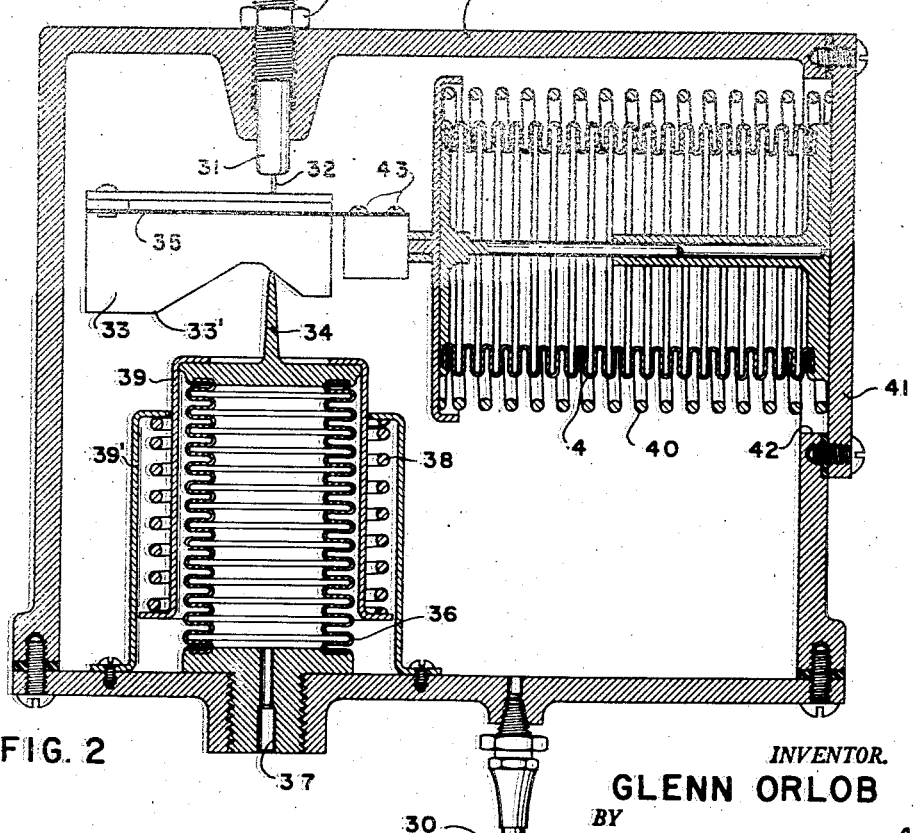
Figure 2 is a longitudinal sectional view through my control unit.

My control unit shown in Figure 2, which governs the flow of air through conduit 2 from the valve actuator cylinder 22, is housed in case 3. A conduit 30 connects the interior of this case with a low pressure region, which in Figure 1 is shown as the atmosphere, since this conduit projects through the aircraft skin 13. Such conduit might, however, be connected to any other region having a sufficiently low pressure, as far as its effect on the flow of air through conduit 2 is concerned. The flow between such conduit and conduit 30 is limited by the degree of opening of a valve 31 regulated by the position of valve stem 32, which may be designated generally a control member since it is the element variable to alter the pressure to which the valve operating means is subjected. This valve may be one similar to those used in pneumatic tires, or be of any other suitable type.

The immediate function of the control unit is to regulate the position of valve stem 32. Such control unit includes a pressure pattern member and a tracing member cooperating with such pattern member for controlling the valve stem operation, either by direct engagement with it, as in the case of the cam pattern member 33 shown, or otherwise, such as by a pattern screen interposed between a light and a photoelectric cell tracing member in the electric circuit of electric valve-moving mechanism for a valve such as 31. The profile shape of the pressure pattern member controls the plan of cabin air pressure regulation, as will be discussed below. The cabin air pressure plan may therefore be changed readily by substituting pressure pattern members of different effective profiles. Any such member may be considered as composed of a family of elements, each element corresponding to a different atmospheric pressure. A dimension of each such element determines the cabin pressure to be maintained at the atmospheric pressure for which such element is effective.

In the generally rectangular type of pressure pattern member, illustrated as the cam member 33, its elements corresponding to atmospheric pressures, designated atmospheric pressure elements, are parallel straight lines extending across it parallel to a line joining valve stem 32 and the profile tracing member 34. At any selected atmospheric pressure only one of such atmospheric pressure elements of the cam can be in registry with the tracing member. The tracing member is movable along a path parallel to such registering element in response to changes in cabin air pressures, either absolute or the differential of cabin air pressure over atmospheric pressure, and the length of such effective pressure pattern member element will govern the action of the tracing member on valve 31, so that the pressure pattern member and the tracing member cooperate to control the cabin air pressure. The pressure pattern member and profile tracing member are moved relatively in a direction perpendicular to the atmospheric pressure elements in response to changes in atmospheric pressure, to place different appropriate elements of the pattern member in alignment with the tracing member. Consequently the length of the atmospheric pressure element of the pattern member for each atmospheric pressure is selected corresponding to the cabin air pressure which it is desired to maintain at altitudes at which such respective atmospheric pressures occur.

Figure 3:
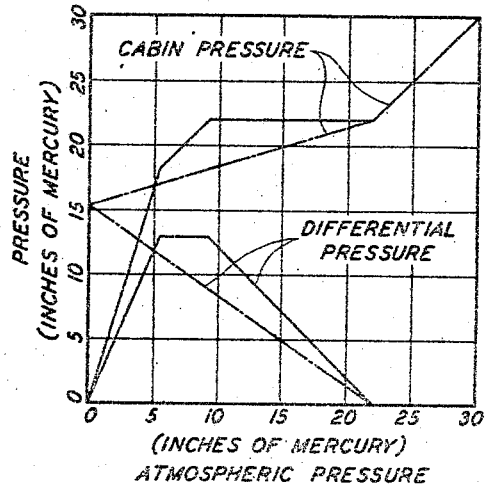
Figure 3 is a diagram showing graphs representing typical plans according to which the pressure in an aircraft cabin may be controlled by my invention.

Before discussing the particular cam and control mechanism associated with it which have been selected for illustration, the type of cabin air pressure regulation which it is desired to achieve should be considered by reference to Figure 3. It will be evident that a straight line drawn from the lower left corner to the upper right corner of the graph would indicate equality of cabin and atmospheric pressure. The upper solid line of that figure represents a preferred type of cabin air pressure variation. Since the "cabin pressure" line coincides with such equal pressure line from 30 inches of mercury to 22 inches of mercury no supercharged effect within the cabin over this range is contemplated.

As the atmospheric pressure decreases, however, the cabin air pressure is shown as remaining constant from 22 inches to 8 inches of mercury, then decreasing at the same rate as atmospheric pressure as the latter drops from 8 inches down to 6 inches of mercury, and the cabin air pressure decreases more rapidly than the atmospheric pressure below an atmospheric pressure of 6 inches of mercury. While the cabin air pressure remains constant over the range within which atmospheric pressure decreases the differential between such pressures increases, as shown by the solid line in the lower portion of Figure 3. This pressure differential remains constant during the period that the cabin air pressure decreases at the same rate as atmospheric pressure, and decreases within the range in which the cabin air pressure drops at a rate greater than the fall in atmospheric pressure.

In order to regulate the cabin air pressure in any desired manner, therefore, it will be evident that it is only necessary to preserve the desired differential of cabin air pressure over atmospheric pressure for any given atmospheric pressure. Consequently the length of the atmospheric pressure elements of the pressure pattern member, such as cam 33, may be selected to correspond to the differential of cabin air pressure over atmospheric pressure at the respective atmospheric pressures corresponding to such elements, provided that the cam follower 34 and valve stem 32 are arranged to operate properly under the control of such a pressure pattern member for regulating the cabin air pressure in a corresponding fashion. If one edge of the cam 33 is straight the profile of the opposite edge, the lower edge as illustrated, will correspond precisely to the shape of the solid differential pressure line shown in Figure 3, considering that the higher atmospheric pressure elements of the cam are toward the left as seen in Figure 2, and its lower atmospheric pressure elements are toward the right. Although the abscissae of the differential pressure lines shown in Figure 3 are not equal to the offset of corresponding portions of the contoured edge of cam 33 engaged by follower 34, these dimensions are proportional throughout.

An alternative plan of cabin air pressure regulation is represented by the dot-dash "cabin pressure" and "differential pressure" lines of Figure 3. Above the altitude range in which cabin air pressure is equal to atmospheric pressure the cabin air pressure decreases progressively at a constant rate of a value less than the rate at which the atmospheric pressure decreases. Consequently the differential of cabin air pressure over atmospheric pressure increases progressively and uniformly, as shown by the dot-dash "differential pressure" line. A pressure pattern member for controlling the cabin air pressure according to this plan would not have a reentrant notch, as in the lower edge of cam 33 shown in Figure 2, but would have a straight oblique surface sloping upwardly from the junction point 33' between the constant differential and varying differential portions of the cam edge, corresponding to the shape of the dot-dash differential pressure line of Figure 3.

At any given altitude the atmospheric pressure element of the pressure pattern member effective to control the cabin air pressure is that in registry with the pattern tracing member, such as the cam follower 34, the length of which atmospheric pressure element corresponds to the differential of cabin air pressure over atmospheric pressure desired at such altitude. The dimension of the cam element 33 aligned with the valve stem 32 and cam follower 34 will, of course, determine their relationship, provided that the cam member is mounted to float freely between them. Such action may be effected by mounting the cam on the free end of a long, limber, cantilever spring leaf 35.

Since the length of the cam's atmospheric pressure element interposed between the valve stem 32 and cam follower 34 corresponds to the differential of cabin air pressure over atmospheric pressure which it is desired to maintain, the cam follower and valve stem are made relatively movable in response to the differential of cabin air pressure over atmospheric pressure. In the particular mechanism illustrated this result is accomplished by mounting the cam follower on one end of a bellows 36, which bellows is subjected to such pressure differential. The interior of the bellows is shown to be in direct communication with the aircraft cabin through aperture 37, and consequently the air within it is at all times equal to cabin air pressure.

A spring 38, reacting between an inner shell 39 immediately surrounding the bellows and an outer shell 39' carried by casing 3, tends to maintain the bellows collapsed against the pressure of the air within them. Also the exterior of the bellows is exposed to atmospheric pressure. If the bellows' exterior is in direct communication with the interior of casing 3, as shown, the low pressure region with which conduit 30 communicates must be the atmosphere, or some region in which the pressure is directly related to atmospheric pressure. Cam follower 34 therefore will be moved up or down in response to the expansion or contraction of bellows 36, which constitutes a differential-pressure sensitive element.

If the cabin air pressure is higher than desired for a given atmospheric pressure, cam follower 34 will be raised by bellows 36 to lift cam 33 against valve stem 32, causing valve 31 to open. Consequently air will be withdrawn through conduit 2 from the upper chamber of valve actuator 10 at a greater rate than before, thus increasing the air pressure differential on diaphragm 15 so that valve 1 will move toward open position. Such movement will cause a larger quantity of air to escape from the cabin, thus reducing the air pressure within it, and consequently within bellows 36, so that cam follower 34 in turn will move downward, allowing valve 32 to close slightly. The cabin air pressure is thus reduced to the desired value by decrease of the pressure differential between it and atmospheric pressure.

Conversely, if the cabin air pressure is lower than desired, spring 38 and the atmospheric pressure acting on the exterior of bellows 36 will hold the cam follower 34 in a position somewhat below that in which it should be, and cam 33, which cannot be supported by flexible spring 35, will rest on the cam follower. Valve stem 32, having moved downward to remain in engagement with the upper edge of the cam, either by gravity or by the pressure of a spring forming part of the mechanism of valve 31, will cause such valve to close, reducing the flow through conduit 2 so that the pressure will build up in the chamber of the pneumatic valve actuator above diaphragm 15. Since the differential pressure on this diaphragm is thus reduced, valve 1 will close slightly, to enable the air pressure within the cabin to increase. When it has risen to the desired value the air pressure within bellows 36 will have increased correspondingly, expanding the bellows, raising cam follower 34, lifting cam 33, pushing upward valve stem 32, and opening valve 31 to restore the flow of air through conduit 2 and the air pressure differential on the valve actuator diaphragm 15. The air pressure within the cabin will thus be restored to the desired value.

At any given altitude the atmospheric pressure line of the cam member 33 effective to control the cabin pressure described, is that aligned with valve stem 32 and cam follower 34. Consequently as the altitude of the aircraft varies the cam member on the one hand, and the cam follower member 34 and valve stem 32 on the other hand, must be moved relatively in a direction perpendicular to the line joining such valve stem and follower automatically in response to fluctuations in atmospheric pressure resulting from changes in altitude of the aircraft. In the particular embodiment shown the valve stem and cam follower are not moved lengthwise of cam member 33, but, on the contrary, the cam member is shifted bodily in a direction perpendicular to a line joining the valve stem and the cam follower. Such movement is effected automatically in response to changes in atmospheric pressure by an evacuated bellows 4 expanded by a spring 40 against the pressure of air within the control unit case 3, which bellows carries the supported end of leaf spring 35 on which the cam member is mounted.

If, as shown in the drawings, bellows 4 has free access to the interior of case 3, it is essential that conduit 30 communicate directly with the atmosphere, or with some region having pressure related directly to atmospheric pressure, as mentioned previously in connection with bellows 36. Also the length of the cam member 33 perpendicular to its atmospheric pressure elements must be related to the characteristics of bellows 4 and spring 40 so that the variation in length of the bellows caused by a given change in atmospheric pressure will effect an appropriate corresponding movement of the cam member properly correlated with its shape. In each position of the cam to which it is moved by the bellows the length of the atmospheric pressure line in registry with the valve stem 32 and the cam follower 34 will control the pressure within the aircraft cabin in the manner explained above.

In order to adjust the degree of opening of valve 31 for a given control system immediately after installation, the valve body may be adjusted bodily relative to the control unit casing 3. This can be effected by screwing the valve body in or out relative to the threaded aperture in the casing in which it is received, and thereafter locking the valve in the desired adjusted position by screwing the lock nut 32' into engagement with the exterior of the casing.

It is obvious that the differential pressure sensitive bellows 36 and the atmospheric pressure sensitive bellows 4 may be mounted in the casing 3 in various ways. To facilitate replacement of cam member 33 by one of different shape, however, the entire assembly of bellows 4, spring 40, cam mounting spring 35, and cam 33 may be carried by a plate 41 removably secured in position to close an access aperture 42. By removing this plate the complete cam assembly can be withdrawn from the casing through such aperture. The cam 33 may then be replaced by a cam of a different shape, such as by removing the screws 43 securing the cam mounting leaf spring 35 to the bellows 4, and attaching a different spring and cam assembly.

I claim as my invention:

1. Mechanism for controlling air pressure within an aircraft cabin, comprising cabin air pressure regulating means operable to control the pressure of air within the cabin, a pressure pattern member having atmospheric pressure elements which correspond respectively to different atmospheric pressures, a pattern tracing member cooperating with said pressure pattern member, a control member operable to control the operation of said cabin air pressure regulating means and regulated by said pattern tracing member in accordance with the disposition of said pattern tracing member relative to an atmospheric pressure element of said pressure pattern member, and atmospheric pressure sensitive means responsive to atmospheric pressure and operable to shift relatively said pressure pattern member and said pattern tracing member in response to changes in atmospheric pressure, thereby to dispose different atmospheric pressure elements of said pressure pattern member in registry with said pattern tracing member in response to corresponding changes in atmospheric pressure.

2. Mechanism for controlling air pressure within an aircraft cabin, comprising valve means movable to control the flow of air through the cabin, valve actuator means operable to move said valve means for controlling the pressure of air within the cabin, a pressure pattern member having atmospheric pressure elements which correspond respectively to different atmospheric pressures, a pattern tracing member cooperating with said pressure pattern member, a control member operable to control the operation of said valve actuator means and regulated by said pattern tracing member in accordance with the disposition of said pattern tracing member relative to an atmospheric pressure element of said pressure pattern member, and atmospheric pressure sensitive means responsive to atmospheric pressure and operable to shift relatively said pressure pattern member and said pattern tracing member in response to changes in atmospheric pressure, thereby to dispose different atmospheric pressure elements of said pressure pattern member in registry with said pattern tracing member in response to corresponding changes in atmospheric pressure.

3. Mechanism for controlling air pressure within an aircraft cabin, comprising valve means movable to control the flow of air through the cabin, valve actuator means operable to move said valve means for controlling the pressure of air within the cabin, a pressure pattern member having atmospheric pressure elements which correspond respectively to different atmospheric pressures, a pattern tracing member cooperating with said pressure pattern member, a control member operable to control the operation of said valve actuator means and regulated by said pattern tracing member in accordance with the joint disposition of said pressure pattern member and said pattern tracing member, atmospheric pressure sensitive means responsive to atmospheric pressure and operable to shift relatively said pressure pattern member and said pattern tracing member in response to changes in atmospheric pressure, thereby to dispose different atmospheric pressure elements of said pressure pattern member in registry with said pattern tracing member in response to corresponding changes in atmospheric pressure, and differential pressure sensitive means responsive to the differential of cabin air pressure over atmospheric pressure and operatively connected to effect relative movement between said pattern tracing member and said control member in response to changes in pressure differential acting on such differential pressure sensitive means, thereby to vary the regulation of said control member by said pattern tracing member in response to variations in such pressure differential.

4. Mechanism for controlling air pressure within an aircraft cabin, comprising cabin air pressure regulating means operable to control the pressure of air within the cabin, a pressure pattern member having atmospheric pressure elements which correspond respectively to different atmospheric pressures, a pattern tracing member cooperating with said pressure pattern member, a control member operable to control the operation of said cabin air pressure regulating means and regulated by said pattern tracing member in accordance with the disposition of said pattern tracing member relative to an atmospheric pressure element of said pressure pattern member, and means responsive to ambient atmospheric pressure and operable to shift relatively said pressure pattern member and said pattern tracing member in response to changes in atmospheric pressure, thereby to dispose different atmospheric pressure elements of said pressure pattern member in registry with said pattern tracing member for different atmospheric pressures.

5. Mechanism as defined in claim 4, and pressure sensitive means movable automatically in response to a change in cabin air pressure and operatively connected to effect relative movement between the pattern tracing member and the control member in response to changes in pressure acting on such pressure sensitive means, thereby to vary the regulation of such control member by the pattern tracing member.

6. Mechanism as defined in claim 4, and differential pressure sensitive means responsive to the differential of cabin air pressure over atmospheric pressure and operatively connected to effect relative movement between the pattern tracing member and the control member in response to changes in pressure differential acting on such differential pressure sensitive means, thereby to vary the regulation of the control member by the pattern tracing member automatically in response to variations in such pressure differential.

7. Mechanism for controlling air pressure within an aircraft cabin comprising cabin air pressure regulating means operable to control the pressure of air within the cabin, a pressure pattern member, having straight line elements which correspond respectively to different atmospheric pressures, a pattern tracing member cooperating with said pressure pattern member, a control member operable to control the operation of said cabin air pressure regulating means and regulated by said pattern tracing member in accordance with the disposition of said pattern tracing member relative to an atmospheric pressure element of said pressure pattern member, and means responsive to atmospheric pressure and operable to shift relatively such pressure pattern member and said pattern tracing member in response to changes in atmospheric pressure, thereby to dispose different atmospheric pressure elements thereof in registry with said pattern tracing member.

8. Mechanism for controlling air pressure within an aircraft cabin, comprising cabin air pressure regulating means operable to control the pressure of air within the cabin, a generally rectangular pressure pattern member having parallel straight elements which correspond respectively to different atmospheric pressures, a pattern tracing member cooperating with said pressure pattern member, a control member operable to control the operation of said cabin air pressure regulating means and regulated by said pattern tracing member in accordance with the disposition of said pattern tracing member relative to an atmospheric pressure element of said pressure pattern member, and means responsive to atmospheric pressure and operable to shift relatively such pressure pattern member and said pattern tracing member in a direction perpendicular to the parallel straight atmospheric pressure elements of said pressure pattern member in response to changes in atmospheric pressure, thereby to dispose different atmospheric pressure elements thereof in registry with said pattern tracing member.

9. Mechanism for controlling air pressure within an aircraft cabin, comprising cabin air pressure regulating means operable to control the pressure of air within the cabin, a pressure pattern cam having straight elements which correspond respectively to different atmospheric pressures, a cam follower member engaging said pressure pattern cam for registry with an atmospheric pressure element thereof, a control member operable to control the operation of said cabin air pressure regulating means and regulated by said cam follower member in accordance with the joint disposition of said cam and said cam follower member, atmospheric pressure sensitive means operable to shift said cam relative to said cam follower to dispose different cam elements in registry with said cam follower in response to corresponding changes in atmospheric pressure, and pressure sensitive means responsive to a change in cabin pressure and operatively connected to effect relative movement between said cam follower and said control member in response to changes in pressure acting on said pressure sensitive means, thereby to vary the regulation of said control member by said cam follower in response to variations in the cabin pressure.

10. Mechanism for controlling air pressure within an aircraft cabin, comprising cabin air pressure regulating means operable to control the pressure of air within the cabin, a generally rectangular pressure pattern cam having parallel straight elements which correspond respectively to different atmospheric pressures, a cam follower member engaging said pressure pattern cam for registry with an atmospheric pressure element thereof, a control member operable to control the operation of said cabin air pressure regulating means and regulated by said cam follower member in accordance with the joint disposition of said cam and said cam follower member, atmospheric pressure sensitive means operable to shift said cam relative to said cam follower in a direction perpendicular to the cam's parallel straight atmospheric pressure elements to dispose different cam elements in registry with said cam follower in response to corresponding changes in atmospheric pressure, and differential pressure sensitive means responsive to the differential of cabin pressure over atmospheric pressure and operable to vary the regulation of said control member by said cam follower in response to variations in such pressure differential.

11. Mechanism for controlling air pressure within an aircraft cabin, comprising cabin air pressure regulating means operable to control the pressure of air within the cabin, a generally rectangular pressure pattern cam having parallel straight elements which correspond respectively to different atmospheric pressures, a cam follower member engaging one edge of said pressure pattern cam for registry with an atmospheric pressure element thereof, a control member engaging the opposite edge of said pressure pattern cam in registry with the same atmospheric pressure cam element and operable to control the operation of said cabin air pressure regulating means, means supporting said cam floating freely between said cam follower and said control member, atmospheric pressure sensitive means operable to shift said cam relative to said cam follower in a direction perpendicular to the cam's parallel straight atmospheric pressure elements to dispose different cam elements in registry with both said cam follower and said control member in response to corresponding changes in atmospheric pressure, and pressure sensitive means responsive to a change in cabin pressure and operable to vary the position of said cam follower in response to variations in the cabin air pressure, thereby to regulate said control member.

GLENN ORLOB.

REFERENCES CITED

The following references are of record in the file of this patent:

UNITED STATES PATENTS

| Number | Name | Date |
|---|---|---|
| 2,208,554 | Price | July 16, 1940 |
| 2,402,681 | Schroeder | June 25, 1946 |